(12) United States Patent
Friesen et al.

(10) Patent No.: US 9,351,437 B2
(45) Date of Patent: May 31, 2016

(54) REAR FOLDING TOOL BAR IMPLEMENT

(71) Applicant: Pillar Lasers Inc., Warman (CA)

(72) Inventors: Dick Edward Friesen, Warman (CA); John Martens, Warman (CA)

(73) Assignee: Pillar Lasers Inc., Warman, Saskatchewan (CA)

( * ) Notice: Subject to any disclaimer, the term of this patent is extended or adjusted under 35 U.S.C. 154(b) by 150 days.

(21) Appl. No.: 14/020,973

(22) Filed: Sep. 9, 2013

(65) Prior Publication Data
US 2014/0069670 A1  Mar. 13, 2014

(30) Foreign Application Priority Data

Sep. 12, 2012 (CA) .................................... 2789618

(51) Int. Cl.
*A01B 73/02* (2006.01)
*A01B 73/04* (2006.01)

(52) U.S. Cl.
CPC ............... *A01B 73/02* (2013.01); *A01B 73/048* (2013.01)

(58) Field of Classification Search
CPC ...... A01B 73/042; A01B 73/06; A01B 73/04; A01B 73/062; A01B 73/048; A01B 63/00; A01B 63/22; A01B 63/02
See application file for complete search history.

(56) References Cited

U.S. PATENT DOCUMENTS

| | | | |
|---|---|---|---|
| 2,828,597 A | | 4/1958 | Moore |
| 2,978,042 A | * | 4/1961 | Jones ............................. 172/323 |
| 3,539,016 A | | 11/1970 | Bauer et al. |
| 3,608,645 A | * | 9/1971 | Meiners ......................... 172/491 |
| 3,640,345 A | | 2/1972 | Sosalla |
| 4,306,732 A | * | 12/1981 | Pettibone ..................... 280/43.23 |
| 4,415,039 A | * | 11/1983 | van der Lely et al. .......... 172/47 |
| 4,418,762 A | | 12/1983 | Page |
| 4,496,004 A | * | 1/1985 | Frase et al. ..................... 172/311 |
| 4,681,335 A | * | 7/1987 | Ledermann et al. ....... 280/446.1 |
| 4,821,809 A | | 4/1989 | Summach et al. |
| 4,871,030 A | * | 10/1989 | Kruse ............................ 172/397 |
| 5,020,604 A | * | 6/1991 | Peck .............................. 172/177 |
| 5,524,712 A | | 6/1996 | Balmer |
| 5,641,026 A | * | 6/1997 | Balmer ......................... 172/452 |
| 6,112,827 A | * | 9/2000 | Reiber et al. .................. 172/311 |
| 6,293,352 B1 | * | 9/2001 | Hundeby ............... A01B 63/32 111/54 |
| 7,861,795 B2 | | 1/2011 | Dillon |
| 2007/0074878 A1 | * | 4/2007 | Franklin ....................... 172/452 |
| 2010/0025056 A1 | * | 2/2010 | Friggstad ..................... 172/452 |
| 2011/0315410 A1 | * | 12/2011 | Kinzenbaw ...................... 172/1 |
| 2014/0190711 A1 | * | 7/2014 | Horsch ............................. 172/1 |

* cited by examiner

FOREIGN PATENT DOCUMENTS

CA  2132128  3/1996

*Primary Examiner* — Robert Pezzuto
*Assistant Examiner* — Jessica H Lutz
(74) *Attorney, Agent, or Firm* — Frost Brown Todd LLC (57) ABSTRACT

A tool bar apparatus has an elongate tool bar having a longitudinal tool bar axis, and ground engaging tools fixed thereto. Wheels are rotatably fixed to the tool bar and roll about a rotational axis parallel to the tool bar. A hitch frame is pivotally attached at a rear end thereof to the tool bar about a hitch pivot axis parallel to the tool bar axis, and has a hitch tongue at a front end thereof. An actuator pivots the tool bar about the hitch pivot axis from an operating position, where the ground engaging tools extend rearward, to a transport position where the ground engaging tools extend upward from the tool bar. The wheels move rearward under the tool bar when the tool bar pivots from the operating position to the transport position such that a downward force is exerted on the hitch tongue when in the transport position.

11 Claims, 6 Drawing Sheets

REAR FOLDING TOOL BAR IMPLEMENT

This invention is in the field of agricultural implements and in particular an implement with wings that rotate upward and then fold rearward for transport.

BACKGROUND

Commonly wide agricultural implements include right and left wing sections pivotally attached to a center section, such that the wings can be folded upward or rearward for transport. Ground engaging tools such as harrows and packers are commonly mounted on tool bar implements that comprise a center hitch frame that is mounted on center wheels at a rear end thereof and extends forward from the center wheels to a hitch tongue adapted to be attached to the drawbar of a towing vehicle. An elongate center tool bar is pivotally mounted on the rear end of the hitch frame such that its axis is perpendicular to the operating travel direction and right and left elongate wing tool bars are in turn pivotally attached to outer ends of the center tool bar about right and left wing axes and extend outward from there. Cables or like braces are connected between the wing tool bars and the hitch frame to support the outer ends of the wing tool bars. Harrows, packers, or like ground engaging tools are attached to the tool bars.

In one common implement type, when in a field working position the ground engaging tools extend rearward from the tool bars and engage the ground, and the outer ends of the wings are supported on field wheels fixed to the tool bars and oriented to roll in the operating travel direction. The wing axes are aligned with the operating travel direction in the field working position so that outer ends of the wings can move up and down to follow field contours.

When moving from the field to the transport position, an actuator on the hitch frame pivots the center tool bar, and through the pivoting attachment also pivots the right and left wing tool bars such that the ground engaging tools are raised off the ground to an upright orientation and the wing axes are substantially vertical. As the wing tool bars rotate, a transport wheel fixed to each wing tool bar moves down into engagement with the ground to support the wing tool bars, and the field wheels are raised above the ground. The transport wheels are oriented to roll perpendicular to the operating travel direction, and as the hitch frame is towed forward, the wing tool bars pivot with respect to the center tool bar about the now vertical wing axes and move to a trailing orientation substantially aligned with the operating travel direction.

Such implements are disclosed for example in U.S. Pat. No. 4,821,809 to Summach, et al., U.S. Pat. No. 4,418,762 to Page, U.S. Pat. No. 3,640,345 to Sosalla, and U.S. Pat. No. 3,539,016 to Bauer et al. U.S. Pat. No. 2,828,597 to Moore shows a similar implement with a somewhat different arrangement where the same wheel is used for field and for transport.

In the field operating position the rear end of the center hitch frame is supported on the center wheels and the hitch tongue at the front end thereof bears down on the drawbar. As the tool bars rotate, the ground engaging tools are raised up off the ground and the weight of the ground engaging tools is transferred from the ground to the tool bars, which are supported on the outer ends of the wing tool bars by the transport wheels, and by the rear end of the hitch frame. Since the rotational axis of the center tool bar is located on the hitch frame rearward of the rotational axis of the center wheels, when the tool bars rotate the weight of the ground engaging tools exerts a downward force rearward of the center wheel such that an upward force is exerted on the hitch tongue.

Agricultural implements typically include a jack mounted adjacent to the hitch tongue to support the hitch weight when the towing vehicle is disconnected, and to facilitate reconnection. In the tool bar implements for harrows, packers, and the like described above however, when in transport there is negative weight on the hitch tongue and the jack must be mounted on a wing tool bar rearward of the rotational axis of the center wheels to support the weight of the tool bars and ground engaging tools and prevent the upward movement of the hitch tongue and maintain the desired vertical location so that the towing vehicle can easily be reconnected.

SUMMARY

It is an object of the present invention to provide an agricultural tool bar apparatus that overcomes one or more problems in the prior art.

Disclosed herein is a tool bar apparatus comprising an elongate center tool bar having a longitudinal tool bar axis, and ground engaging tools fixed to the center tool bar. Center wheels are rotatably fixed to the center tool bar and oriented to support the center tool bar and roll on a ground surface about a rotational axis substantially parallel to the tool bar axis in an operating travel direction substantially perpendicular to the tool bar axis. A hitch frame is pivotally attached at a rear end thereof to the center tool bar about a hitch pivot axis oriented substantially parallel to the tool bar axis, the hitch frame having a hitch tongue at a front end thereof adapted for connection to a towing vehicle. An actuator is operative to pivot the center tool bar about the hitch pivot axis from a field operating position, where the ground engaging tools extend rearward from the center tool bar and are supported on the ground surface, through an intermediate position where the ground engaging tools extend rearward and upward from the center tool bar above the ground surface, to a transport position where the ground engaging tools extend upward from the center tool bar. The center wheels move rearward under the center tool bar when the center tool bar pivots from the field operating position to the transport position such that a downward hitch force is exerted on the hitch tongue when in the transport position.

Rather than placing a jack on the wings rearward of the center tool bar when disconnecting as in the typical prior art tool bar implement, the jack may be placed adjacent to the hitch tongue where same can be conveniently operated to adjust the hitch tongue height for connecting to a towing vehicle. The downward force on the hitch tongue simplifies connection to a towing vehicle for movement of the implement only in the transport position, since it is not required to take care to prevent upward movement of the hitch tongue, and makes the implement more similar to other trailers and like towed equipment where the hitch tongue has a downward force. The apparatus is thus safer to transport and store.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE
ILLUSTRATED EMBODIMENTS

Figure 1:
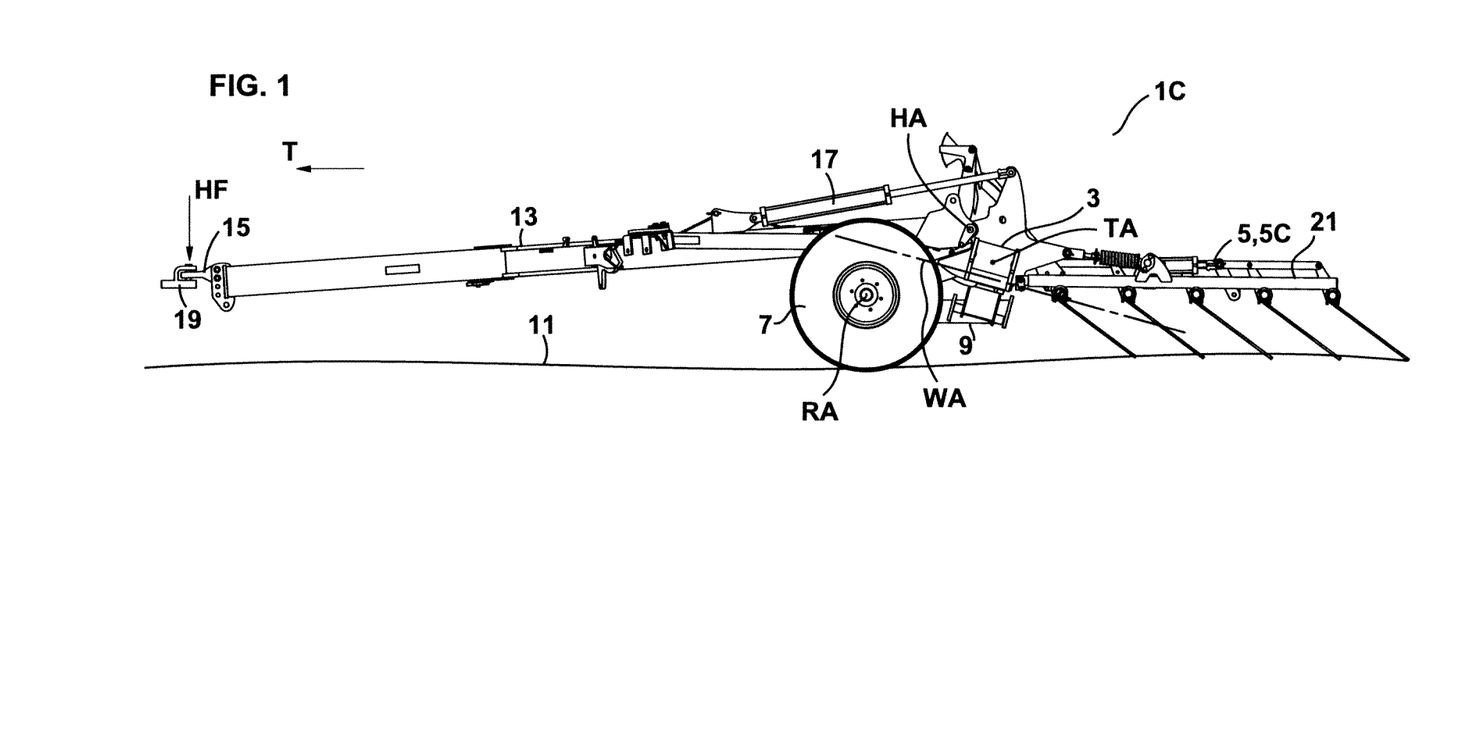
FIG. 1 is a side view of the center portion of an embodiment of a tool bar apparatus of the present invention with wings removed, shown in the field operating position.
Figure 2:
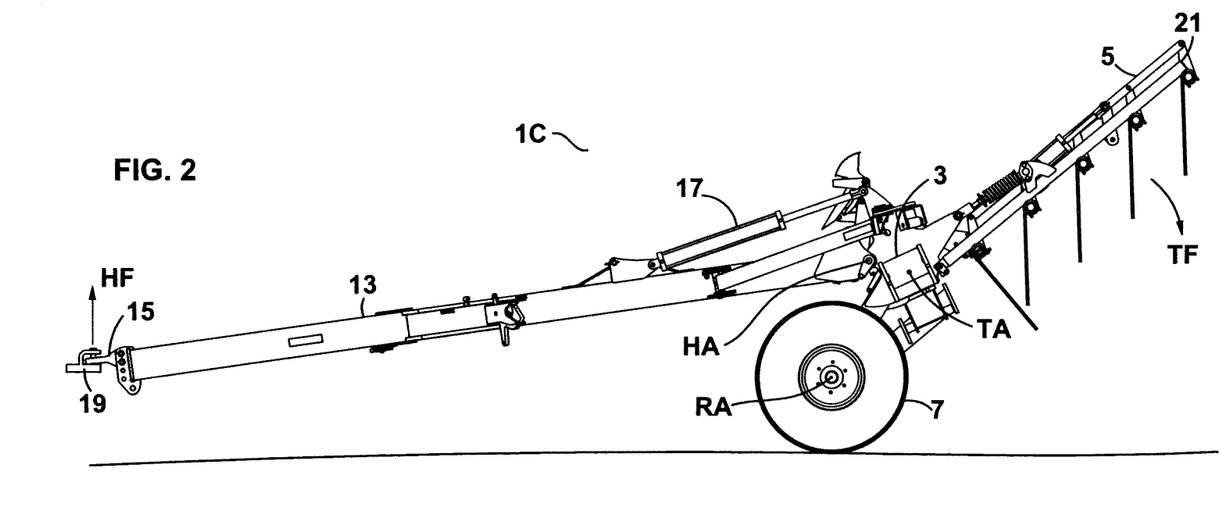
FIG. 2 is a side view of the center portion of FIG. 1, shown in an intermediate position between the field operating position and the transport position.
Figure 3:
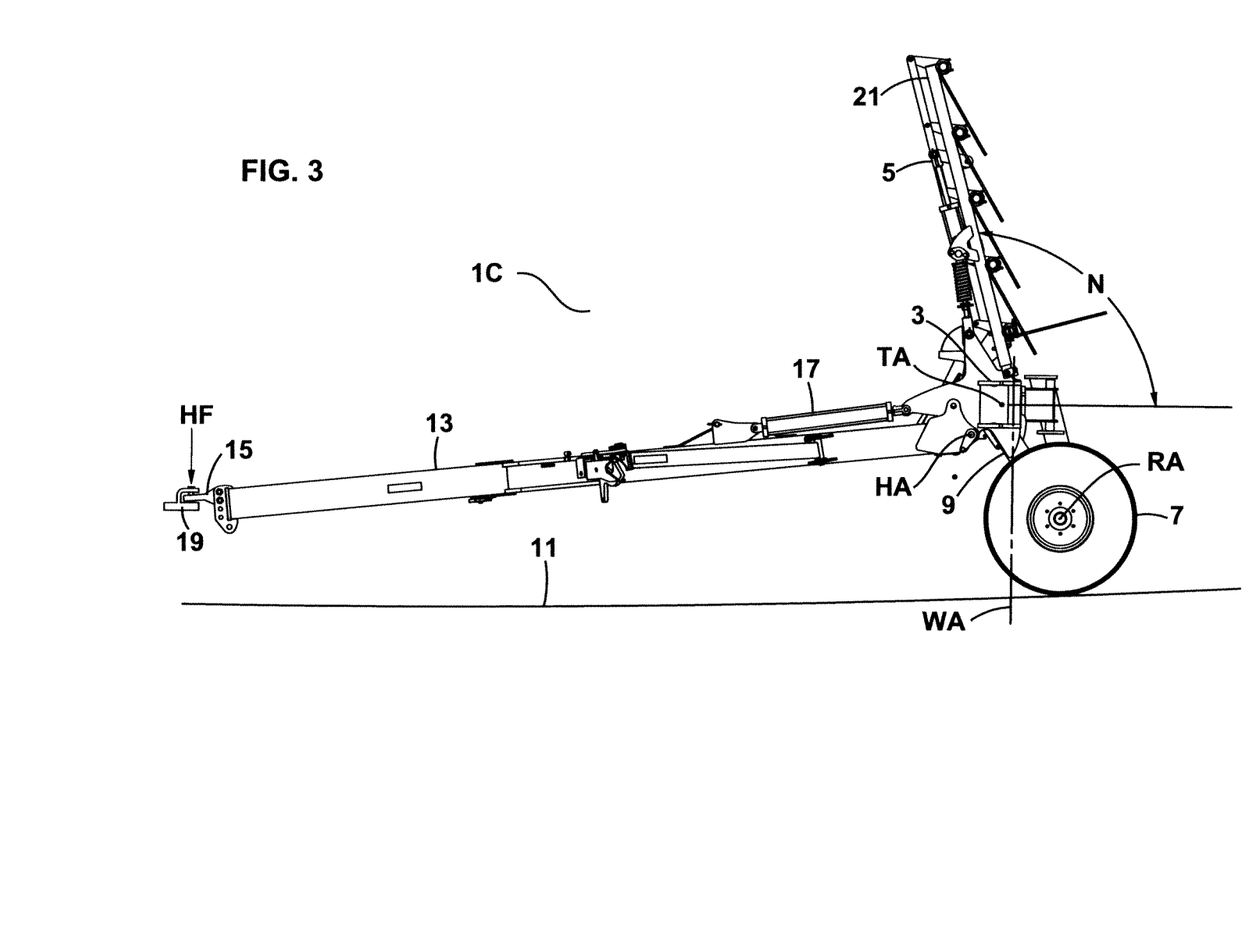
FIG. 3 is a side view of the center portion of FIG. 1, shown in the transport position.
Figure 4:
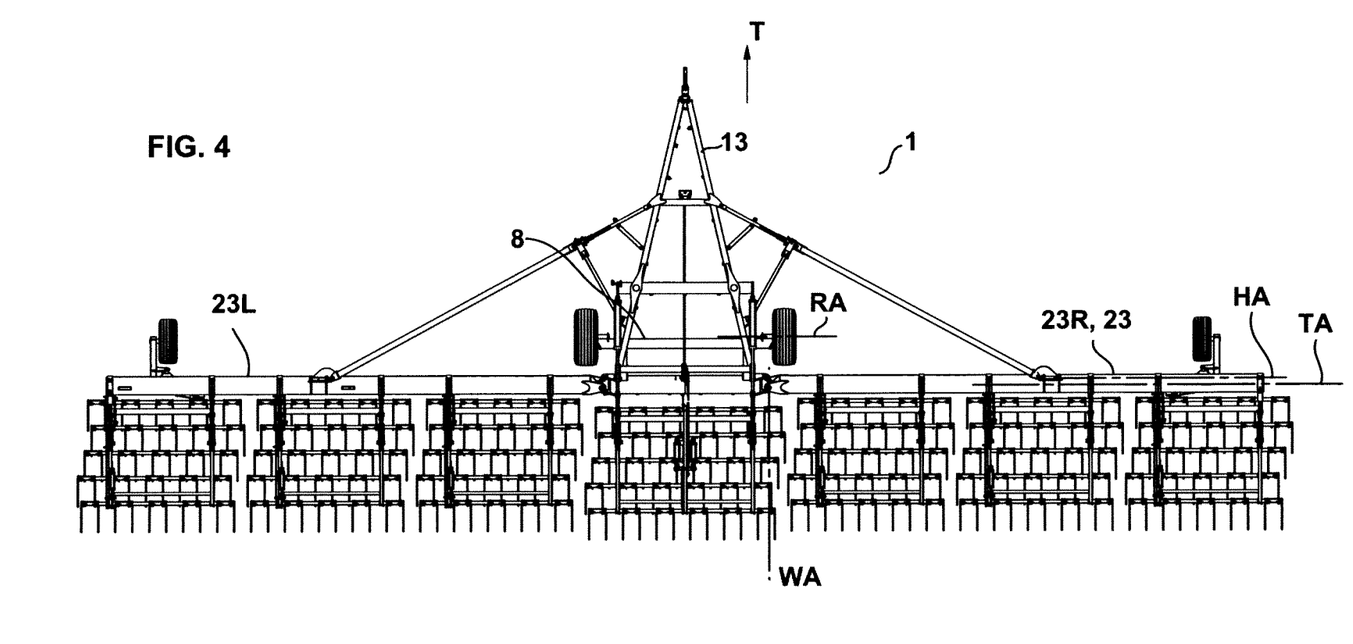
FIG. 4 is a top view of the embodiment of the tool bar apparatus of FIG. 1 with wings attached, shown in the field operating position.
Figure 5:
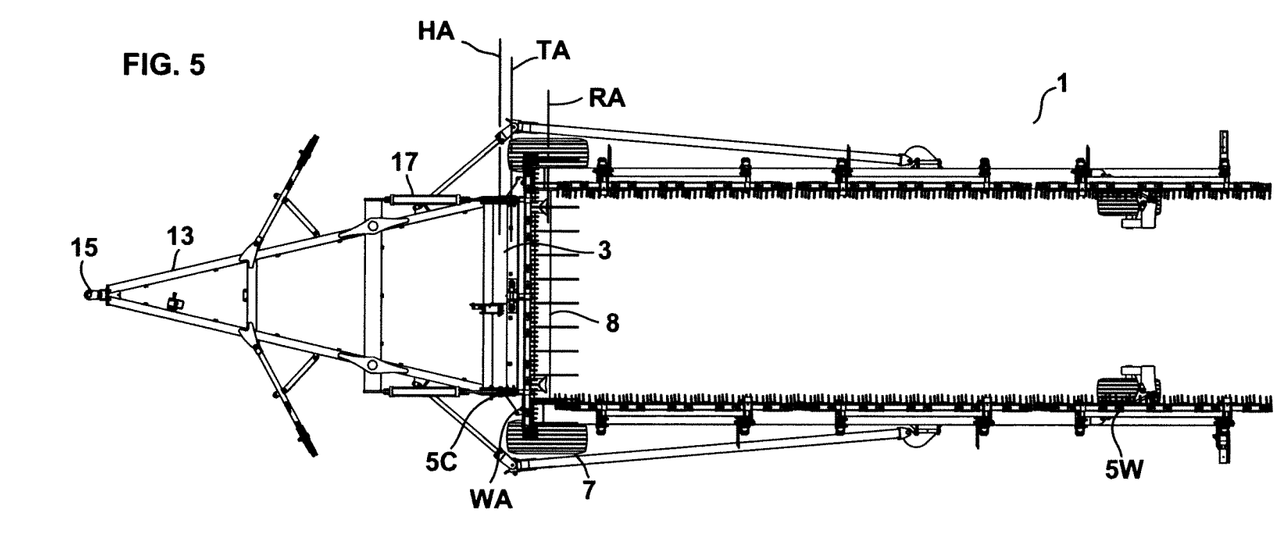
FIG. 5 is a top view of the embodiment of the tool bar apparatus of FIG. 1 with wings attached, shown in the transport position.

FIGS. 1-5 illustrate an embodiment of a tool bar apparatus 1. FIGS. 1-3 show a side view of the center portion 1C of the apparatus 1 with the wing tool bars removed, while FIGS. 4 and 5 schematically illustrate top views of the complete apparatus 1 in field operating position and transport position respectively.

The apparatus 1 comprises an elongate center tool bar 3 having a longitudinal tool bar axis TA, and ground engaging tools 5 fixed to the center tool bar 3. Center wheels 7 are rotatably fixed to the center tool bar 3. The center wheels 7 are mounted on ends of an axle 8 mounted on arms 9 that are attached to and extend forward from the center tool bar 3 and are oriented to support the center tool bar 3 and roll on a ground surface 11 about a rotational axis RA that is substantially parallel to the tool bar axis TA in an operating travel direction T substantially perpendicular to the tool bar axis TA.

A hitch frame 13 is pivotally attached at a rear end thereof to the center tool bar 3 about a hitch pivot axis HA oriented substantially parallel to the tool bar axis TA. The hitch frame 13 has a hitch tongue 15 at a front end thereof adapted for connection to a towing vehicle.

An actuator 17, illustrated as an extendable hydraulic cylinder, is connected between the hitch frame 13 and a bracket attached to the center tool bar 3, and is operative to pivot the center tool bar 3 about the hitch pivot axis HA from the field operating position shown in FIG. 1 where the ground engaging tools 5 extend rearward from the center tool bar 3 and are supported on the ground surface 11, through the intermediate position shown in FIG. 2 where the ground engaging tools 5 extend rearward and upward from the center tool bar 3 above the ground surface 11, to the transport position shown in FIG. 3 where the ground engaging tools 5 extend upward from the center tool bar 3.

In the field operating position of FIG. 1 the weight of the hitch frame 13 is carried on the center wheels 7 and the drawbar 19 of a connected towing vehicle, and so a downward hitch force HF is exerted on the hitch tongue 15 when in the field operating position. The hydraulic cylinder actuator 17 can also be extended to put down pressure on the ground engaging tools 5 and thus exert increased downward force on the hitch frame 13.

As seen in FIG. 1 the rotational axis RA of the center wheels 3 is forward of the hitch pivot axis HA and tool bar axis TA when in the field operating position. As seen in FIGS. 2 and 3, when the hydraulic cylinder actuator 17 is retracted to pivot the center tool bar 3 about the hitch pivot axis HA, the center wheels 7 move rearward under the center tool bar 3 as the center tool bar 3 pivots upward from the field operating position of FIG. 1 to the intermediate position of FIG. 2. As the ground engaging tools 5 rise off the ground surface 11 the weight thereof is all carried on the central tool bar 3 and causes a torque force TF that exerts an upward hitch force HF on the hitch tongue 15 when the center tool bar 3 is in the intermediate position.

As the center tool bar 3 pivots further toward the transport position, the ground engaging tools 5 move upward and forward and the center wheels 7 move farther rearward. The weight of the ground engaging tools 5 and tool bar 3 moves forward with respect to the rotational axis RA of the center wheels 7 such that in the transport position of FIG. 3, the rotational axis RA of the center wheels 3 is rearward of the tool bar axis TA and the upward extending ground engaging tools 5, such that the weight of the tool bar 3 and ground engaging tools 5 is forward of the rotational axis RA of the center wheels 7, and so a downward hitch force HF is exerted on the hitch tongue 13. In the illustrated apparatus 1, in the transport position the rotational axis RA of the center wheels 7 is also rearward of the hitch pivot axis HA.

In the illustrated apparatus 1 as well, when in the field operating position the hitch pivot axis HA is rearward of the rotational axis RA of the center wheels 7 and forward of the tool bar axis TA, and when in the transport position the hitch pivot axis HA is forward of the rotational axis RA of the center wheels 3 and also forward of the tool bar axis TA.

Comparing the position of FIG. 1 and FIG. 3 it can be seen that the center tool bar 3 pivots about the hitch pivot axis HA through an angle N greater than ninety degrees when moving from the field operating position of FIG. 1 to the transport position of FIG. 3. In the field operating position of FIG. 1 the frames 21 of the ground engaging tools 5 extend horizontally rearward from the center tool bar 3, while in the transport position of FIG. 3 the frames 21 of the ground engaging tools 5 have moved through the angle N of about 96 degrees and so extend upward and tilt forward from the center tool bar 3.

This forward tilt orientation places added weight and increases the downward hitch force HF on the hitch tongue 15 in the transport position of FIG. 3.

While it is contemplated that a very narrow implement apparatus could be desired which required only the center tool bar 3, more conventionally wings will be added to provide a wider implement. FIGS. 4 and 5 schematically illustrate the apparatus 1 of FIGS. 1-3 with right and left wing tool bars 23R, 23L pivotally attached to corresponding right and left ends of the center tool bar 3 about wing axes WA. Wing ground engaging tools 5W are mounted to the wing tool bars 23 in the same manner as center ground engaging tools 5C are mounted to the center tool bar 3. The wing axes WA are oriented such that outside ends of the wing tool bars 23 can pivot up and down about the wing axes WA when in the field operating position shown in FIG. 4, where the center tool bar 3 is in the field operating position of FIG. 1. The wing axes WA are further oriented such that the wing tool bars 23 can pivot rearward about the wing axes WA to the trailing transport position shown in FIG. 5, where the center tool bar 3 is in the transport position of FIG. 3

The wing axes WA are tilted downward from horizontal when in the field operating position, as best seen in FIG. 1. Thus when the center tool bar 3 pivots about the hitch pivot axis HA through the angle N as shown in FIG. 3, the wing axes WA move from the downward tilted orientation of FIG. 1 to the vertical orientation of FIG. 3 so that the wings can pivot rearward about the vertical wing axes to the transport position of FIG. 5. The wing ground engaging tools 5W are thus also tilted forward when the center tool bar 3 pivots to the transport position, in about the same orientation as the center ground engaging tools 5C.

The weight of the inner ends of the wing tool bars 23 is carried on the ends of the center tool bar 3 at the wing axes WA. The wing axes WA are forward of the rotational axis RA of the center wheels 3 when in the transport position, such that the weight of the inner ends of the wing tool bars 23 is also forward of the rotational axis RA, increasing the downward hitch force HF on the hitch tongue 15.

Figure 6:
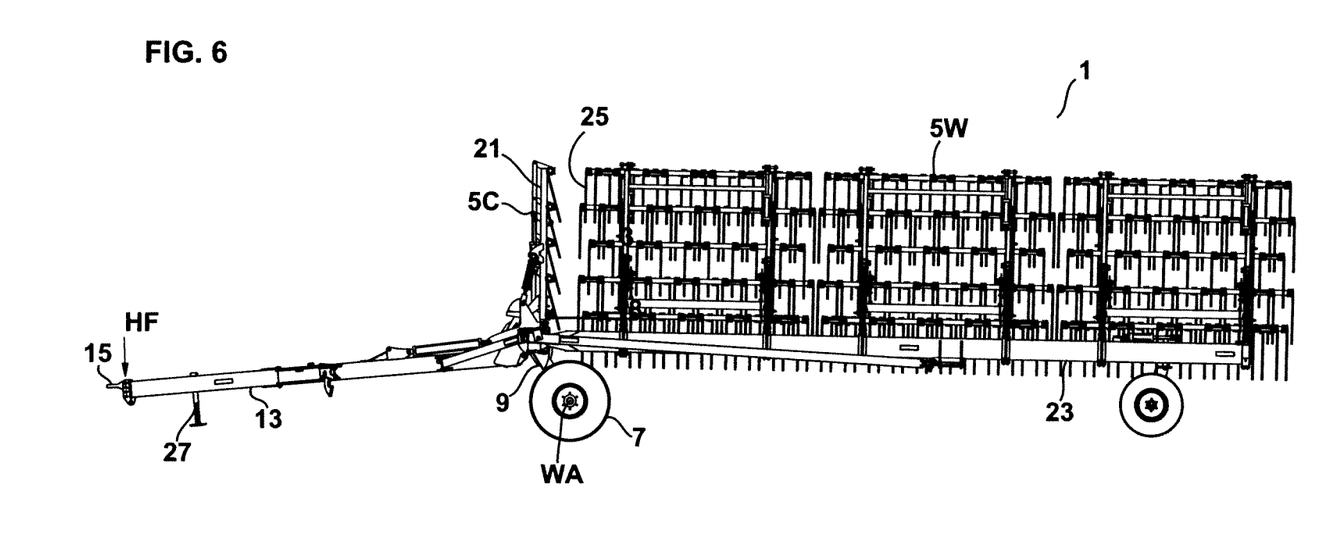
FIG. 6 is a side view of the embodiment of the tool bar apparatus of FIG. 1 with wings attached, shown in the transport position.

As seen in FIG. 6, the forward tilt of the ground engaging tools 5C also alleviates the problem of the wing ground engaging tools 5W contacting the center ground engaging tools 5C when in the illustrated transport position.

Where the ground engaging tools 5 are for example harrows mounted on frames 21 as illustrated, the frames 21 of center ground engaging tools 5C are forward of the inner edges 25 of the wing ground engaging tools 5W. The inner edges 25 of the wing ground engaging tools 5W also tilt outwards away from the center ground engaging tools 5C, such that separation between the wing and center ground engaging tools 5W, 5C is increased. The frames 21 of the wing and center ground engaging tools 5W, 5C are thus tilted away from each other, with only the harrow teeth contacting each other.

The instant disclosure thus provides a tool bar apparatus 1 where the center wheels 7 are fixed to the center tool bar 3 and pivot with the center tool bar 3 when same pivots from the field operating position to the transport position such that the weight of the center tool bar 3, and the weight of wing tool bars 23 supported on the center tool bar 3, is forward of the rotational axis RA of the center wheels 7 when in the transport position, resulting in a downward force on the hitch tongue 15.

Thus in one embodiment, a jack 27 is placed adjacent to the hitch tongue 15, as schematically illustrated in FIG. 6 to support the hitch frame 13 when the towing vehicle is disconnected. The jack 27 can be conveniently operated to move the hitch tongue 15 up and down to re-connect to a towing vehicle. When connecting to a towing vehicle with the intention of working the apparatus 1 in the field operating position care must be taken to prevent upward movement of the hitch tongue 15, since during the intermediate stages between the field operating position and the transport position an upward force will be exerted on the hitch tongue 15. If however it is desired to simply connect to a towing vehicle to move the apparatus 1 from one location to another while in the transport position, which is a regular occurrence in a typical farm operation, or for delivery from a dealer to a farm customer, weight is always downward on the hitch tongue 15, and such precautions are not required.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A tool bar apparatus comprising:
   an elongate center tool bar having a longitudinal tool bar axis, and ground engaging tools fixed to the center tool bar;
   center wheels rotatably fixed to the center tool bar and oriented to support the center tool bar and roll on a ground surface about a rotational axis that is in a fixed position with respect to the center tool bar and oriented substantially parallel to the tool bar axis in an operating travel direction substantially perpendicular to the tool bar axis;
   a hitch frame pivotally attached at a rear end thereof to the center tool bar about a hitch pivot axis oriented substantially parallel to the tool bar axis, the hitch frame having a hitch tongue at a front end thereof adapted for connection to a towing vehicle;
   an actuator operative to pivot the center tool bar about the hitch pivot axis from a field operating position, where the ground engaging tools extend rearward from the center tool bar and are supported on the ground surface and the hitch pivot axis is above and forward of the tool bar axis, through an intermediate position where the ground engaging tools extend rearward and upward from the center tool bar above the ground surface, to a transport position where the ground engaging tools extend upward from the center tool bar and the hitch pivot axis is below and forward of the tool bar axis;
   wherein the center wheels move rearward under the center tool bar when the center tool bar pivots from the field operating position to the transport position such that a downward hitch force is exerted on the hitch tongue when in the transport position.

2. The apparatus of claim 1 wherein a downward hitch force is exerted on the hitch tongue when in the field operating position and wherein an upward hitch force is exerted on the hitch tongue when the center tool bar is in the intermediate position.

3. The apparatus of claim 1 wherein the rotational axis of the center wheels is forward of the hitch pivot axis and tool bar axis when in the field operating position and moves rearward under the center tool bar as the center tool bar pivots about the hitch pivot axis to the transport position, and wherein the rotational axis of the center wheels is rearward of the hitch pivot axis and the tool bar axis when in the transport position.

4. The apparatus of claim 1 wherein the center tool bar pivots about the hitch pivot axis through an angle greater than ninety degrees when moving from the field operating position to the transport position such that the ground engaging tools extend upward and forward from the center tool bar when in the transport position.

5. The apparatus of claim 1 wherein the center wheels are mounted on arms extending forward from the center tool bar.

6. The apparatus of claim 1 wherein the hitch pivot axis is rearward of the rotational axis of the center wheels when in the field operating position.

7. The apparatus of claim 6 wherein the hitch pivot axis is forward of the rotational axis of the center wheels and forward of the tool bar axis when in the transport position.

8. The apparatus of claim 1 comprising right and left wing tool bars pivotally attached to corresponding right and left ends of the center tool bar about wing axes and ground engaging tools fixed to the right and left wing tool bars, wherein the wing axes are oriented such that outside ends of the wing tool bars can pivot up and down about the wing axes when in the field operating position, and wherein the wing tool bars can pivot rearward about the wing axes to a trailing transport position.

9. The apparatus of claim 8 wherein the wing axes are oriented substantially vertically when in the transport position.

10. The apparatus of claim 9 wherein the wing axes are tilted downward from horizontal when in the field operating position, such that the center tool bar pivots with respect to the hitch tongue through an angle greater than ninety degrees when moving between the field operating position and the transport position.

11. The apparatus of claim 8 wherein the wing axes are forward of the rotational axis of the center wheels when in the transport position.

\* \* \* \* \*